United States Patent Office 3,185,693
Patented May 25, 1965

3,185,693
β,β'-BIS(SUBSTITUTED SULFONYLTHIO)DIETHYL PIPERAZINE
Joseph E. Dunbar, Midland, Mich., assignor to The Dow Chemical Company, Midland, Mich., a corporation of Delaware
No Drawing. Filed Oct. 28, 1963, Ser. No. 319,508
3 Claims. (Cl. 260—268)

The present invention is directed to β,β'-bis-(substituted sulfonylthio)diethylpiperazines corresponding to the formula

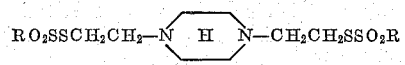

and their hydrohalide salts. In this and succeeding formulae, R represents a member of the group consisting of lower alkyl, phenyl, lower alkyl phenyl, halophenyl and lower alkyl-halophenyl. In the present specification and claims, the expression "lower alkyl" is employed to designate an alkyl group containing up to and including 6 carbon atoms and "halide" to designate chlorine, bromine or iodine. These compounds are crystalline solid materials at room temperature, are somewhat soluble in many common organic solvents and are of low solubility in water. The compounds are useful as pesticides and are adapted to be employed as the toxic constituent in compositions used for the control of a number of worm, insect, bacterial and fungal organisms such as helminths, beetles, ticks, roaches, potato and tomato late blight, *Aspergillus terreus*, *Pullularia pullulans* and *Rhizopus nigricans*.

The novel (substituted sulfonylthio)diethylpiperazines of the present invention are prepared by reacting a β,β'-dihalodiethylpiperazine corresponding to the formula:

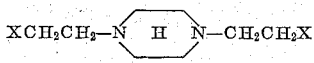

where X represents halogen, with an alkai metal salt of a thiosulfonic acid corresponding to the formula:

Alkali metal-S—SO$_2$—R

The hydrohalide salt compounds of the present invention are prepared by reacting together a β,β'-dihalodiethylpiperazine dihydrohalide having the formula

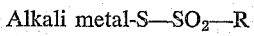

with an alkali metal salt of thiosulfonic acid. The reaction conveniently is carried out in an organic liquid as reaction medium such as dimethylformamide, ethanol, methanol, propanol, nitromethane, acetone, aqueous acetone, aqueous methanol, aqueous ethanol, and sulfolane. The amounts of the reagents to be employed and reaction conditions are not critical, some of the desired product being obtained at once when employing any proportion of the reactants. However, the reaction consumes the reactants in molecular proportions of two moles of the alkali metal salt of thiosulfonic acid for every one mole of the (substituted sulfonylthio)diethylpiperazine which is consumed. Representative materials to be employed are sodium 3-methyl-5-chlorobenzenethiosulfonate,
sodium 3,5-dimethyl-4-bromobenzenethiosulfonate,
potassium 2-iodobenzenethiosulfonate,
potassium 3-methylbutanethiosulfonate,
potassium 3,4,5-tribromobenzenethiosulfonate,
sodium 2,6-dimethyl-5-chlorobenzenethiosulfonate,
sodium 3-ethyl-5-iodobenzenethiosulfonate and
potassium tert.-butanethiosulfonate.

The reaction takes place smoothly at temperatures at which the halide of reaction is formed and conveniently at temperatures of from 25 to 130° C. However, it is preferable to carry out the reaction at temperatures between 55 and 100° C. The halide of reaction appears in the reaction mixture as alkali metal halide salt.

In carrying out the reaction, the reactants are mixed and contacted together in any convenient fashion and the resulting mixture maintained at the reaction temperature until there is a substantial cessation in the production of the halide of reaction. Following the heating period, the halide of reaction is removed by filtration. The filtrate is then cooled by any conventional means to facilitate the precipitation of the desired product. In another acceptable procedure the product and halide of reaction can be allowed to precipitate out of the reaction medium. The halide of reaction can then be removed by washing with water. The product in this form may be employed in pesticidal compositions or further purified by such conventional procedures as washing or recrystallization from a common organic solvent.

In an alternative procedure the dihydrohalide salts of the present invention may be prepared by reacting together a β,β'-bis(substituted sulfonylthio)diethyl piperazine and dry gaseous hydrogen halide, such as hydrogen chloride, hydrogen bromide or hydrogen iodide. The reaction is conveniently carried out in an organic solvent such as ether, carbon tetrachloride and chloroform.

In a convenient procedure the β,β'-bis(substituted sulfonylthio)diethylpiperazine is dissolved in the organic reaction medium and the gaseous hydrogen halide is introduced into the reaction mixture. The amounts of the reagents and reaction conditions to be employed are not critical, some of the desired product being obtained at once when employing any proportion of the reactants. However, best results are obtained when stoichiometric amounts of the reactants are used. The reaction consumes two moles of hydrogen halide for every mole of β,β'-bis(substituted sulfonylthio)diethylpiperazine. The reaction takes place smoothly at temperatures between −50 and 20° C. and preferably at −10° C. The crystalline dihydrohalide product is separated and purified by the procedures as previously described.

EXAMPLE 1

β,β'-Bis(methylsulfonylthio)diethylpiperazine

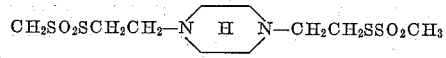

β,β'-Dibromodiethylpiperazine (4.0 grams; 0.013 mole) and potassium methanethiosulfonate (4.0 grams; 0.026 mole) were dispersed in 10 milliliters of dimethylformamide. The resulting mixture was heated, with stirring, at 95° C. for one hour, then filtered to remove the potassium bromide of reaction. The filtrate was then rapidly diluted with ice water whereupon the β,β'-bis(methylsulfonylthio)diethylpiperazine product precipitated as a crystalline solid. This solid material was collected on a filter and recrystallized from nitromethane. The colorless recrystallized product melted at 174–176° C. and had carbon, hydrogen and nitrogen contents of 32.96, 5.79 and 7.69 percent, respectively, as compared to the theoretical contents of 33.13, 6.12, and 7.73 percent.

EXAMPLE 2

β,β'-Bis(p-tolylsulfonylthio)diethylpiperazine dihydrobromide

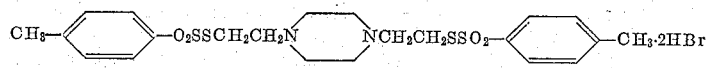

$\beta,\beta'$-Dibromodiethylpiperazine dihydrobromide (9.6 grams; 0.021 mole) and potassium p-toluenethiosulfonate (9.5 grams; 0.042 mole) were dispersed in 250 milliliters of ethanol. The resulting mixture was heated at the boiling temperature under reflux for one hour. The hot reaction mixture was filtered to remove the potassium bromide and then cooled. As a result of the cooling the $\beta,\beta'$-bis(p-tolylsulfonylthio)diethylpiperazine dihydrobromide product precipitated as a crystalline solid. The crystalline product was collected by filtration and recrystallized from ethanol to yield colorless crystals which melted, with decomposition, between the temperatures of 202° and 260° C. The recrystallized product had carbon, hydrogen and nitrogen contents of 38.83, 4.73 and 4.45 percent, respectively, as compared to the theoretical contents of 39.05, 4.77 and 4.14 percent.

EXAMPLE 3

$\beta,\beta'$-Bis(p-bromophenylsulfonylthio)diethylpiperazine 6.6 grams (0.022 mole) of $\beta,\beta'$-dibromodiethylpiperazine and 12.8 grams (0.044 mole) potassium p-bromobenzenethiosulfonate were dispersed in 150 milliliters of ethanol. The resulting mixture was heated at the boiling temperature, under reflux, for one and one-half hours. The hot reaction mixture was filtered to remove the halide of reaction. The filtrate was then cooled to facilitate the precipitation of the $\beta,\beta'$-bis(p-bromophenylsulfonylthio)diethylpiperazine product as a crystalline solid. This solid was recrystallized from nitromethane to give light tan crystals melting at 165–166.5° C. The recrystallized product had carbon, hydrogen and nitrogen contents of 37.25, 3.82 and 4.50 percent, respectively, as compared to the theoretical contents of 37.27, 3.75 and 4.35 percent.

In a similar manner, other products of the present invention are prepared as follows:

$\beta,\beta'$ - Bis(3,4 - dibromophenylsulfonylthio)diethylpiperazine (molecular weight of 806) by reacting together potassium 3,4 - dibromobenzenethiosulfonate and $\beta,\beta'$ - dichlorodiethylpiperazine.

$\beta,\beta'$ - Bis(3,5 - dichloro - p - tolylsulfonylthio) - diethylpiperazine hydrobromide (molecular weight of 656) by reacting together potassium (3,5-dichloro-p-toluene)-thiosulfonate and $\beta,\beta'$ - dibromodiethylpiperazine dihydrobromide.

$\beta,\beta'$ - Bis(methylsulfonylthio)diethylpiperazine dihydrobromide (melted, with decomposition, at temperatures between 175 and 248° C.; carbon, hydrogen and nitrogen contents of 23.01, 4.76 and 5.40 per cent, respectively, as compared to theoretical contents of 22.90, 4.61 and 5.34 per cent) by reacting together potassium methanethiosulfonate and $\beta,\beta'$ - dibromodiethylpiperazine dihydrobromide.

$\beta,\beta'$ - Bis(butylsulfonylthio)diethylpiperazine (melting at 102–104° C. and having carbon, hydrogen and nitrogen contents of 42.86, 7.93 and 6.16 per cent, respectively, as compared to theoretical contents of 43.02, 7.67 and 6.27 per cent) by reacting together potassium butanethiosulfonate and $\beta,\beta'$-dibromodiethylpiperazine.

$\beta,\beta'$ - Bis(3,5 - diethylphenylsulfonylthio)diethylpiperazine (molecular weight of 602) by reacting together sodium 3,5 - diethylbenzenethiosulfonate with $\beta,\beta'$ - dichlorodiethylpiperazine.

$\beta,\beta'$ - Bis(4 - ethylphenylsulfonylthio)diethylpiperazine dihydrobromide (molecular weight of 707) by reacting together $\beta,\beta'$ - bis(4 - ethylphenylsulfonylthio) - diethylpiperazine and gaseous hydrogen bromide.

$\beta,\beta'$ - Bis(3,4,5 - trimethylphenylsulfonylthio) - diethylpiperazine (molecular weight of 584) by reacting together potassium 3,4,5-trimethylbenzenethiosulfonate with $\beta,\beta'$-diiododiethylpiperazine.

$\beta,\beta'$ - Bis(2 - chloro - 4 - isopropylphenylsulfonylthio)-diethylpiperazine (molecular weight of 647) by reacting together sodium 2 - chloro - 4 - isopropylbenzenethiosulfonate and $\beta,\beta'$-dichlorodiethylpiperazine.

$\beta,\beta'$ - Bis(2,4,5 - trichlorophenylsulfonylthio) - diethylpiperazine (molecular weight of 727) by reacting together potassium 2,4,5 - trichlorobenzenethiosulfonate with $\beta,\beta'$-dibromodiethylpiperazine.

$\beta,\beta'$ - Bis(2,4,6 - tribromophenylsulfonylthio) - diethylpiperazine (molecular weight of 963) by reacting together sodium 3,4,6 - tribromobenzenethiosulfonate with $\beta,\beta'$ - diiododiethylpiperazine.

$\beta,\beta'$ - Bis(pentachlorophenylsulfonylthio) - diethylpiperazine dihydrochloride (molecular weight of 835) by reacting together sodium pentachlorobenzenethiosulfonate with $\beta,\beta'$ - dichlorodiethylpiperazine dihydrochloride.

$\beta,\beta'$ - Bis(2,5 - dimethylsulfonylthio)diethylpiperazine dihydrobromide (molecular weight of 546) by reacting together potassium 2,5 - dimethylbenzenethio - sulfonate and $\beta,\beta'$ - dibromodiethylpiperazine dihydrobromide.

$\beta,\beta'$ - Bis(p - tolylsulfonylthio)diethylpiperazine (melting at 148–150° C. and having carbon, hydrogen and nitrogen contents of 51.37, 5.79 and 5.33 percent, respectively, as compared with theoretical contents of 51.33, 5.88 and 5.44 percent) by reacting together potassium p-toluenethiosulfonate and $\beta,\beta'$ - dibromodiethylpiperazine.

$\beta,\beta'$ - Bis(2,3 - dimethylbutylsulfonylthio)diethylpiperazine (molecular weight of 506) by reacting together sodium 2,3-dimethylbutane thiosulfonate and $\beta,\beta'$-dibromodiethylpiperazine.

$\beta,\beta'$ - Bis(2,4 - dichlorophenylsulfonylthio) - diethylpiperazine dihydroiodide (molecular weight of 882) by reacting together $\beta,\beta'$ - bis(2,4 - dichlorophenylsulfonylthio)piperazine and gaseous hydrogen iodide.

The compounds of the present invention or the compositions containing the same as the toxic constituent can be applied to pests and their habitats and foods in parasiticidal amounts to obtain excellent controls and kills of many organisms. The compounds also can be used as the toxic constituent in compositions for the control of the blight diseases of various plants. For such use the products are dispersed on a finely divided solid and employed as dusts. Also, such mixtures may be dispersed in water with or without the aid of a surface active dispersing agent and the resulting aqueous suspensions employed as sprays. In other procedures, the products are employed as the toxic constituents in solvent solutions, oil-in-water, or water-in-oil emulsions or aqueous dispersions. In representative operations $\beta,\beta'$ - bis(methylsulfonylthio) - diethylpiperazine dihydrobromide gave excellent control of tomato and potato late blight, *Phytophthora infestans*, when employed in aqueous compositions at concentrations of 300 parts per million by weight.

The thiosulfonates employed as starting materials in accordance with the teachings of the present invention can be prepared in accordance with known methods. In one method, potassium hydrosulfide (KSH) is reacted with a suitable lower alkane, benzene, halobenzene, lower alkylbenzene or lower alkyl-halobenzenesulfonyl halide. Representative halides include, hexanesulfonyl chloride, pentamethylbenzenesulfonyl bromide, 4-hexylbenzenesulfonyl chloride, 2,6-dichloro-4-propylbenzenesulfonyl chloride, propanesulfonyl chloride, 4 - iodobenzenesulfonyl chloride, and 2,4 - diethylbenzenesulfonyl bromide. In a convenient procedure, the reaction is carried out by adding the sulfonyl halide to an aqueous or alcoholic solution of potassium hydroxide saturated with $H_2S$. Upon completion of the reaction, the desired starting materials are separated by conventional procedures.

The $\beta,\beta'$ - dihalodiethyl piperazines dihydrohalides, wherein halo represents chlorine, bromine and iodine, which are used as starting materials in the present invention are prepared by known procedures wherein a $\beta,\beta'$-dihydroxydiethyl piperazine is reacted with concentrated aqueous hydrogen halide or with gaseous hydrogen halide. The reaction is preferably carried out in the presence of an organic solvent such as diethyl ether as reaction medium. The $\beta,\beta'$ - dihalodiethyl piperazine hydrohalide product is then separated from the reaction mixture by conventional means.

The dihalodiethylpiperazine free bases are in turn prepared from the corresponding β,β'-dihalodiethyl piperazine hydrothalides. The hydrohalide is reacted with an aqueous solution of a basic material such as alkali metal hydroxide or alkali metal carbonate. The β,β'-dihalodiethyl piperazine is then removed from the reaction medium by such conventional means as extraction with an organic solvent. The solvent can then be evaporated to obtain the product as a crystalline solid.

I claim:
1. A compound corresponding to the formula

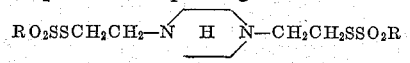

and the hydrohalide salts thereof, wherein R represents a member of the group consisting of lower alkyl, phenyl, lower alkylphenyl, halophenyl, and lower alkyl-halophenyl.

2. β,β' - Bis(methylsulfonylthio)diethylpiperazine dihydrobromide.

3. β,β' - Bis(4 - bromophenylsulfonylthio)diethylpiperazine.

No references cited.

IRVING MARCUS, *Primary Examiner.*